United States Patent
Laubender et al.

(10) Patent No.: US 8,497,318 B2
(45) Date of Patent: Jul. 30, 2013

(54) COPOLYMERS OF MONOCARBOXYLIC ACIDS AND DICARBOXYLIC ACIDS, THEIR PREPARATION AND USE

(75) Inventors: Matthias Laubender, Schifferstadt (DE); Ewald Heintz, Schweigen-Rechtenbach (DE); Clarissa Seidl, Neuhofen (DE); Bolette Urtel, Bobenheim-Roxheim (DE); Alexsandro Berger, Rosenheim (DE)

(73) Assignee: BASF SE, Ludwigshafen (DE)

( * ) Notice: Subject to any disclaimer, the term of this patent is extended or adjusted under 35 U.S.C. 154(b) by 76 days.

(21) Appl. No.: 13/174,955

(22) Filed: Jul. 1, 2011

(65) Prior Publication Data
US 2012/0004383 A1 Jan. 5, 2012

Related U.S. Application Data

(60) Provisional application No. 61/360,534, filed on Jul. 1, 2010.

(51) Int. Cl.
C08G 63/48 (2006.01)
C08G 63/91 (2006.01)
C08L 67/00 (2006.01)
C08L 67/02 (2006.01)

(52) U.S. Cl.
USPC .................................. 525/10; 525/27; 525/20

(58) Field of Classification Search
USPC .............................................. 525/10, 27, 20
See application file for complete search history.

(56) References Cited

U.S. PATENT DOCUMENTS

| | | | |
|---|---|---|---|
| 4,046,707 A | 9/1977 | Smith et al. | |
| 5,077,361 A | 12/1991 | Hughes et al. | |
| 5,294,686 A | 3/1994 | Fiarman et al. | |
| 5,376,731 A | 12/1994 | Kerr et al. | |
| 5,409,571 A * | 4/1995 | Togo et al. ................ | 162/48 |

FOREIGN PATENT DOCUMENTS
EP 0 877 076 A2 11/1998

OTHER PUBLICATIONS
U.S. Appl. No. 13/569,538, filed Aug. 8, 2012, Detering, et al.

* cited by examiner

*Primary Examiner* — William Cheung
(74) *Attorney, Agent, or Firm* — Oblon, Spivak, McClelland, Maier & Neustadt, L.L.P.

(57) ABSTRACT

The invention relates to a process for preparing a polymer by free-radical polymerization of at least one ethylenically unsaturated monocarboxylic acid and/or a salt thereof, at least one ethylenically unsaturated dicarboxylic acid and/or an anhydride and/or a salt thereof, in the presence of hypophosphorous acid and/or a salt thereof. The invention also relates to a polymer composition obtainable by this process. The invention also relates to the use of such a polymer composition as detergent additive, e.g. as dispersant, scale inhibitor or sequestrant for laundry detergents.

12 Claims, No Drawings

COPOLYMERS OF MONOCARBOXYLIC ACIDS AND DICARBOXYLIC ACIDS, THEIR PREPARATION AND USE

FIELD OF THE INVENTION

The invention relates to a process for preparing a polymer by free-radical polymerization of at least one ethylenically unsaturated monocarboxylic acid and/or a salt thereof, at least one ethylenically unsaturated dicarboxylic acid and/or an anhydride and/or a salt thereof, in the presence of hypophosphorous acid and/or a salt thereof. The invention also relates to a polymer composition obtainable by this process. The invention also relates to the use of such a polymer composition as detergent additive, e.g. as dispersant, scale inhibitor or sequestrant for laundry detergents.

BACKGROUND OF THE INVENTION

Low molecular weight polycarboxylic acid polymers and their salts are useful as dispersants, scale inhibitors, detergent additives, sequestrants, etc. Generally a weight average molecular weight below 50 000 is necessary for effective performance and often weight average molecular weights below 10 000 are most effective. It is common to use chain transfer agents in the polymerization reaction to produce low molecular weight polymers. Hypophosphorous acid or its salts (e.g. sodium hypophosphite) are a special type of chain transfer agent, chosen to introduce phosphorus-containing groups, like phosphinate and/or phosphonate groups into water soluble polymers to modify their performance properties. In many cases, however, the overall performance properties of the resulting polymer compositions still need improvement.

Thus, there continues to be a need for polymer compositions which have a very low molecular weight, preferably in conjunction with a high solids content. Such compositions are suitable as dispersants, sequestrants, etc. They are especially suitable for producing detergent compositions that can be employed in laundry washing.

U.S. Pat. No. 5,409,571 describes the use of terpolymers with maleic acid units, acrylic acid units and hypophosphorous acid units as scale deposition inhibitors for Kraft digesters.

EP 0877076 A2 describes detergent formulations comprising at least one water soluble polymer or salt thereof bearing at least one phosphonate group. The polymers used in the formulations, may comprise monoethylenically unsaturated ($C_3$-$C_7$)-mono-carboxylic acids, such as acrylic acid and methacrylic acid, and monoethylenically unsaturated ($C_4$-$C_8$)-di-carboxylic acids, such as maleic acid and itaconic acid. With regard to suitable methods to prepare the phosphonate containing polymers reference is made to U.S. Pat. No. 4,046707, U.S. Pat. No. 5,376,731, U.S. Pat. No. 5,077,361 and U.S. Pat. No. 5,294,686.

SUMMARY OF THE INVENTION

It is an object of the present invention to provide a polymer composition having improved performance properties, in particular as detergent additive, dispersant for laundry detergents, scale inhibitor for laundry detergents and/or sequestrant. Preferably, the provided polymer compositions should exhibit a low molecular weight and/or a high solids content. Further, the polymer composition according to the invention should have a low residual content of compounds having a low molecular weight.

Surprisingly it has been found that this object is achieved by a polymerization process using hypophosphorous acid and/or a salt thereof as chain transfer agent that is added to the polymerization zone at least partly at the same time as a monomer feed.

According to a first aspect of the present invention there is provided a process for preparing a polymer by free-radical polymerization of a) at least one ethylenically unsaturated monocarboxylic acid and/or a salt thereof, b) at least one ethylenically unsaturated dicarboxylic acid and/or an anhydride and/or a salt thereof, in the presence of c) hypophosphorous acid and/or a salt thereof, comprising providing in a polymerization zone an initial charge that contains at least a part of monomer component b) and adding a monomer feed, containing at least a part of monomer component a) to the polymerization zone, wherein during the addition of the monomer feed at least a part of the hypophosphorous acid or a salt thereof (=component c)) is added to the polymerization zone.

According to a further aspect of the present invention a polymer composition is provided that is obtainable by the process of the invention.

A further aspect of the present invention relates to the use of such a polymer composition as detergent additive, dispersant for laundry detergents, scale inhibitor for laundry detergents or sequestrant.

DETAILED DESCRIPTION OF THE INVENTION

The polymer compositions of the invention have at least one of the following advantageous properties:

possibility to abstain from the use of sulphur-containing chain transfer agents, high compatibility with a multiplicity of formulations, in particular detergent formulations used in laundry washing, good anti-encrustation and anti-deposition performance characteristics for laundry applications, possibility to provide laundry detergents with lower graying tendency, a low residual content of unreacted monomers, in particular a low residual content of monomers b).

According to the process of the invention the polymerization is performed in the presence of hypophosphorous acid and/or a salt thereof (=component c). Suitable hypophosphorous acid salts are alkali metal salts or the ammonium salt. Preferred are sodium hypophosphite or potassium hypophosphite.

Preferably, the amount of component c) in the initial charge does not exceed 50% by weight, more preferably does not exceed 25% by weight, in particular does not exceed 10% by weight, based on the total amount of component c) used in the process of the invention.

In an especially preferred embodiment, essentially no component c) is employed in the initial charge. The term "essentially no" means that the amount of hypophosphorous acid and/or salts thereof that is employed in the initial charge does not exceed 5% by weight, preferably does not exceed 1% by weight, more preferably does not exceed 0.5% by weight, based on the total amount of component c) employed. In particular no component c) is employed in the initial charge.

The amount of component c) is preferably in a range of from 0.1 to 30 parts by weight, more preferably 0.2 to 25 parts by weight, in particular 0.5 to 20 parts by weight, based on the total monomer weight.

In a special embodiment, essentially no chain transfer agent (also denoted as regulators or polymerization regulators) different from component c) is employed in the process of the invention. The term "essentially no" means that the amount of chain transfer agents different from component c) that are employed in the polymerization process does not exceed 5% by weight, more preferably does not exceed 1% by weight, in particular does not exceed 0.5% by weight, based on the total amount of components c) and chain transfer agents different therefrom.

Conventional regulators are described for example in detail by K. C. Berger and G. Brandrup in J. Brandrup, E. H. Immergut, Polymer Handbook, 3$^{rd}$ edition, John Wiley & Sons, New York, 1989, pages II/81-II/141. The compounds usually employed as regulators comprise sulfur in bound form. Conventional polymerization regulators are in particular thiols (compounds which comprise sulfur in the form of SH groups, also referred to as mercaptans), mercapto alcohols and mercapto carboxylic acids.

Preferably, the amount of component b) in the initial charge is at least 50% by weight, preferably at least 75% by weight, more preferably at least 90% by weight, based on the total amount of component b) employed.

In an especially preferred embodiment, essentially the total amount of component b) is employed in the initial charge. The term "essentially the total amount" means that the amount of component b) that is employed in the initial charge is at least 95% by weight, more preferably at least 99% by weight, in particular at least 99.5% by weight, based on the total amount of component b) used in the process of the invention.

Monomers a) are preferably selected from monoethylenically unsaturated ($C_3$-$C_7$)-monocarboxylic acids and salts thereof. Suitable salts are alkali metal salts or ammonium salts. Preferably, monomer a) is selected from acrylic acid, methacrylic acid, crotonic acid, vinylacetic acid and the alkali metal and ammonium salts thereof. In particular monomer a) comprises acrylic acid or a salt thereof. In a special embodiment, monomer a) consists of acrylic acid and/or a salt thereof.

Monomers b) are preferably selected from monoethylenically unsaturated ($C_4$-$C_8$)-di-carboxylic acids and/or an anhydride and/or a salt thereof. Suitable salts are alkali metal salts or ammonium salts. Preferably, monomer b) is selected from such maleic acid, maleic anhydride, fumaric acid, citraconic acid, citraconic anhydride, itaconic acid and the salts thereof. In particular monomer b) is selected from maleic acid, maleic anhydride and/or a salt thereof. In a special embodiment, monomer component b) consists of maleic acid, maleic anhydride and/or a salt thereof.

In a preferred embodiment component a) is acrylic acid and/or a salt thereof and component b) is selected from maleic acid, maleic anhydride and salts thereof.

The weight ratio of component a) to component b) is preferably in a range of from 99:1 to 1:99, more preferably of from 95:5 to 5:95. In a preferred embodiment component a) is acrylic acid and/or a salt thereof and component b) is selected from maleic acid, maleic anhydride and salts thereof. According to this embodiment the weight ratio of component a) to component b) is preferably in a range of from 95:5 to 30:70, more preferably of from 90:10 to 50:50.

For the polymerization, a suitable polymerization initiator is used. Suitable are thermally activatable free-radical polymerization initiators and redox initiator system.

Suitable thermally activatable free-radical initiators are primarily those of the peroxy and azo type. These include, inter alia, hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5-bis(hydroperoxy)hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dieicosyl peroxydicarbonate, di-t-butyl perbenzoate, azobisisobutyronitrile, 2,2'-azobis-2,4-dimethylvaleronitrile, ammonium persulfate, potassium persulfate, sodium persulfate and sodium perphosphate.

Hydrogen peroxide is most preferred.

The amount of initiator is preferably about 0.05 to 25% by weight and in particular 0.1 to 10% by weight, based on the total weight of the monomers used.

According to another preferred type of preparation, the polymer is obtained through polymerization of a monomer mixture in the presence of a redox initiator system. A redox initiator system comprises at least one oxidizing agent component and at least one reducing agent component, where, in the reaction medium, preferably heavy metal ions are additionally present as catalyst, for example iron (II) salts, cerium salts or manganese salts.

Suitable oxidizing agent components are, for example, peroxides and/or hydroperoxides, such as hydrogen peroxide, tert-butyl hydroperoxide, cumene hydroperoxide, pinane hydroperoxide, diisopropylphenyl hydroperoxide, dicyclohexyl percarbonate, dibenzoyl peroxide, dilauroyl peroxide and diacetyl peroxide. Hydrogen peroxide is preferred as oxidizing agent.

Suitable as reducing agent component or catalyst are iron (II) salts, such as, for example, iron (II) sulfate, tin(II) salts, such as, for example, tin(II) chloride, titanium(III) salts, such as titanium(III) sulfate.

Suitable reducing agent components are also alkali metal sulfites, alkali metal dithionites, alkali metal hyposulfites, sodium hydrogensulfite, Rongalit C (sodium formaldehyde sulfoxide), mono- and dihydroxyacetone, sugars (e.g. glucose or dextrose), ascorbic acid and its salts, acetone bisulfite adduct and/or an alkali metal salt of hydroxymethanesulfinic acid.

The use amounts of oxidizing agent are 0.001 to 5.0% by weight, preferably from 0.005 to 1.0% by weight and particularly preferably from 0.01 to 0.5% by weight, based on the total weight of the monomers used. Reducing agents are used in amounts of from 0.001 to 2.0% by weight, preferably from 0.005 to 1.0% by weight and particularly preferably from 0.01 to 0.5% by weight, based on the total weight of the monomers used.

The combination of a polymerization initiator that comprises hydrogen peroxide and hypophosphorous acid as chain regulator leads to polymer compositions with especially advantageous application. In particular those polymer compositions have a very low molecular weight and/or high solid contents.

In a preferred embodiment, essentially no polymerization initiator is employed in the initial charge. The term "essentially no" means that the amount of polymerization initiator that is employed in the initial charge does not exceed 5% by weight, preferably does not exceed 1% by weight, more preferably does not exceed 0.5% by weight, based on the total amount of initiator employed in the process of the invention. In particular no polymerization initiator is employed in the initial charge.

The polymerization preferably takes place in an aqueous medium. The term "aqueous medium" in the sense of the invention means water and mixtures of water and a least one water-miscible organic solvent. Suitable water-miscible organic solvents are alcohols, ketones, etc. Preferred alcohols are methanol, ethanol, n-propanol, isopropanol, n-butanol and mixtures thereof. The polymerization medium used is preferably exclusively water.

Suitable for adjusting the pH during the polymerization or subsequent thereto are in principle all inorganic or organic bases, especially those soluble in water. Examples of suitable bases are alkali metal and alkaline earth metal hydroxides, ammonia and primary, secondary and tertiary amines such as triethylamine, and amino alcohols such as triethanolamine, methyldiethanolamine, dimethylethanolamine or 2-amino-2-methylpropanol. The pH of the polymerization mixture can be determined before, during and after the polymerization by suitable measuring devices, for example by a combined electrode.

The polymerization is preferably carried out at a temperature of from 30° C. to 180° C., more preferably 50° C. to 150° C.

The polymerization may take place under atmospheric pressure or under reduced or elevated pressure. A preferred pressure range is 1 to 10 bar, more preferably 1 to 5 bar.

In a preferred embodiment, the polymerization takes place in the presence of at least one inert gas such as, for example, nitrogen or argon.

The polymerization preferably takes place in the form of a feed process with an initial charge. The individual feeds can in this connection be introduced into the polymerization zone continuously or in a staged or gradient procedure. In one possible embodiment, the polymerization takes place as a feed process in which at least part of monomer component b) is initially charged, and the other components are added in whole or in part, batchwise or continuously, together or in separate feeds to the initial charge.

It is an essential feature of the invention that hypophosphorous acid and/or a salt thereof (=component c) is added to the polymerization zone at least partly at the same time as a monomer feed. Preferably component c) is added to the polymerization zone at least partly at the same time as a monomer feed that consists of monomer component a).

It is preferred in the process of the invention that at least a part of monomer component b) is initially charged in the polymerization zone employed for the reaction. It is preferred, that monomer component b) employed in the initial charge is partly or completely neutralized (in the salt form).

It is preferred that the initial charge in the polymerization zone is heated to the polymerization temperature, and then the remainder of the polymerization mixture is introduced via one or more spatially separate feeds into the polymerization zone. The introduction of monomers and/or initiator expediently takes place in this connection at the rate with which they are consumed, i.e. maintaining the polymerization. Normally, component c), the polymerization initiator and monomers are added in separate feeds in this case. The monomers can be introduced in principle singly or in the form of mixtures.

A further object of the invention is a polymer composition that is obtainable by the afore-described process.

The polymers contained in the polymer composition according to the invention are water-soluble.

The polymer composition according to the invention exhibits a high solids content as a solution in water. Thus, it is possible to provide polymer compositions having a solids content of up to 40% by weight, or even up to 50% by weight, as an aqueous solution. Such high solid contents are of particular importance for many applications.

The polymers contained in the polymer composition according to the invention comprise phosphorus-containing units incorporated therein. The phosphorus-containing units may inter alia have the following structure:

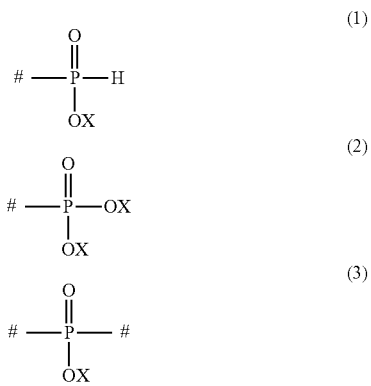

wherein
\# is a binding site to a polymer residue, and
X is selected from hydrogen, monovalent cations or monovalent equivalents of polyvalent cations.
Preferably X is selected from H, Na, K and $NH_4^+$.

The polymer compositions according to the invention may also comprise phosphorus-containing compounds selected from compounds having the following structure:

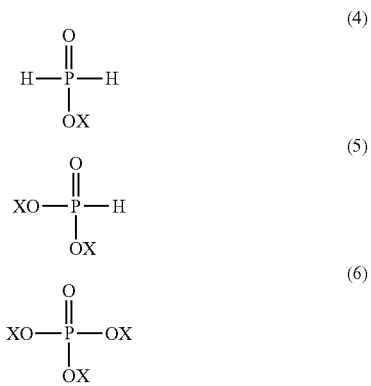

The polymer compositions according to the invention have superior properties over phosphorus-containing polymer compositions of the prior art that are obtained by a polymerization process, wherein hypophosphorous acid (salts) are employed essentially in the initial feed. Without being bound to any theory, it is believed that a co-feed of hypophosphorous acid and at least a part of the monomers, in particular acrylic acid (salts), leads to a polymer composition that contains polymers, wherein the phosphorus containing groups are incorporated in statistically (randomized) form. The polymer compositions obtained by the special process of the invention have a higher content of phosphorus-containing units of the structure (2) in comparison to polymer compositions obtained by conventional processes. Advantageously, this leads to improved application properties as scale inhibitors for laundry detergents.

The polymers present in the polymer composition of the invention preferably have a K value (determined by the Fikentscher method on a 1% strength solution in water) in the range from 10 to 40, more preferably in the range from 12 to 25.

The polymers present in the polymer compositions of the invention, preferably have a number average molecular weight $M_n$ determined by gel permeation chromatography in the range from 300 to 20 000 g/mol, more preferably 500 to 15 000 g/mol, in particular 750 to 10 000 g/mol.

The polymers present in the polymer compositions of the invention, preferably have an average molecular weight $M_w$ determined by gel permeation chromatography in the range from 500 to 50 000 g/mol, more preferably 1 000 to 35 000 g/mol, in particular 1 500 to 25 000 g/mol.

The polydispersity ($M_w/M_n$) of the polymers present in the polymer compositions of the invention is preferably in a range of from 1.5 to 8, more preferably 2 to 5.

The polymer composition according to the invention advantageously has very low residual contents of low molecular compounds.

The polymer composition of the invention comprises monomers a) preferably in a residual amount not exceeding 500 ppm by weight, particularly preferably not exceeding 100 ppm by weight, in particular not exceeding 50 ppm by weight.

In a special embodiment, the polymer composition of the invention comprises acrylic acid and salts thereof preferably in a residual amount not exceeding 500 ppm by weight, particularly preferably not exceeding 100 ppm by weight, in particular not exceeding 50 ppm by weight.

The polymer composition of the invention comprises monomers b) preferably in a residual amount not exceeding 1% by weight, particularly preferably not exceeding 0.5% by weight, in particular not exceeding 0.1% by weight.

In a special embodiment, the polymer composition of the invention comprises maleic acid and anhydrides and salts thereof preferably in a residual amount not exceeding 1% by weight, particularly preferably not exceeding 0.5% by weight, in particular not exceeding 0.1% by weight.

The polymer composition of the invention comprises hydrogen peroxide preferably in a residual amount not exceeding 500 ppm by weight, particularly preferably not exceeding 100 ppm by weight, in particular not exceeding 50 ppm by weight.

The polymer compositions of the invention are outstandingly suitable for detergent compositions that are employed in the washing of textiles. They have very good anti-encrustation and anti-deposition performance characteristics. Moreover, they are universally usable in highly differing detergents such as liquid and solid detergents or detergent formulations. In particular, they have good compatibility with the remaining detergent components, especially with regard to liquid detergents and detergent formulations.

For the purposes of the present invention, good compatibility means that the inventive polymer compositions can be readily incorporated or formulated into detergent formulations comprising conventional components without the occurrence of demixing operations, and that the resulting detergents or detergent formulations have good stability, especially with respect to demixing, in the course of typical shelf lives. In the case of liquid detergent formulations, this means in particular that there is no significant precipitation of the polymer compositions and no cloudiness before and during use.

The polymer compositions according to the invention are generally used in amounts in the range from 0.05 to 5% by weight, preferably from 0.1 to 2% by weight, based in each case on the total weight of the detergent compositions. They are suitable for both heavy duty detergents and for specialty detergents such as color detergents. They are also suitable for pre-treatment detergents.

The detergents may be used in solid form, for example in powder, granule, extrudate or tablet form, and also as compact detergents having a bulk density in the range from 500 to 950 g/l, or in a liquid version. They comprise the typically used anionic, nonionic and/or cationic surfactants in amounts of from 2 to 50% by weight, preferably from 8 to 30% by weight, based in each case on the total weight of the detergents or detergent formulations. Particular preference is given to producing phosphate-free or reduced-phosphate detergent compositions which have a phosphate content of at most 25% by weight, based in each case on the total weight of the detergent composition, calculated as pentasodium tripolyphosphate.

Suitable anionic surfactants are, for example, $C_8$-$C_{22}$-, preferably $C_{10}$-$C_{18}$-fatty alcohol sulfates, for example $C_9/C_{11}$-alcohol sulfate, $C_{12}/C_{14}$-alcohol sulfate, lauryl sulfate, cetyl sulfate, myristyl sulfate, palmityl sulfate, stearyl sulfate and tallow fat alcohol sulfate.

Further suitable anionic surfactants are sulfated alkoxylated $C_8$-$C_{22}$-, preferably $C_{10}$-$C_{18}$-alcohols or soluble salts thereof. Compounds of this type are prepared, for example, by initially alkoxylating the alcohol and subsequently sulfating the alkoxylation product. For the alkoxylation, preference is given to using ethylene oxide, in which case from 2 to 50 mol, in particular from 3 to 20 mol, of ethylene oxide are used per mole of fatty alcohol. However, the alkoxylation may also be carried out with propylene oxide or with butylene oxide. It will be appreciated that the alkylene oxides may also be used in combination. The alkoxylated alcohols may in that case contain the ethylene oxide, propylene oxide and/or butylene oxide units in the form of blocks or in random distribution.

Also suitable as anionic surfactants are alkylsulfonates, especially $C_8$-$C_{24}$- and in particular $C_{10}$-$C_{18}$-alkylsulfonates, and also soaps, for example the salts of aliphatic $C_8$-$C_{24}$-carboxylic acids.

Further suitable anionic surfactants are linear $C_9$-$C_{20}$-alkylbenzenesulfonates (LAS).

The anionic surfactants are added to the detergent preferably in the form of salts. Suitable cations are alkali metal ions such as sodium, potassium and lithium ions, and ammonium ions, for example hydroxyethylammonium, di(hydroxyethyl)ammonium and tri(hydroxyethyl)ammonium ions.

Suitable nonionic surfactants are, for example, alkoxylated $C_8$-$C_{22}$-, in particular $C_{10}$-$C_{18}$-alcohols, such as fatty alcohol alkoxylates, oxo alcohol alkoxylates and Guerbet alcohol alkoxylates. The alkoxylation may be carried out using ethylene oxide, propylene oxide and/or butylene oxide. The alkoxylated alcohols may in that case contain the alkylene oxide units in the form of blocks or in random distribution. From 2 to 50 mol, preferably from 3 to 20 mol, of at least one of these alkylene oxides are used per mole of alcohol. The alkylene oxide used is preferably ethylene oxide.

Further suitable nonionic surfactants are alkylphenol alkoxylates, in particular $C_6$-$C_{14}$-alkylphenol ethoxylates having on average from 5 to 30 alkylene oxide units.

Further suitable nonionic surfactants are $C_8$-$C_{22}$-, in particular $C_{10}$-$C_{18}$-alkylpolyglucosides. These compounds contain from 1 to 20, preferably from 1.1 to 5, glucoside units.

A further class of suitable nonionic surfactants is that of N-alkylglucamides of the structures (NT1) and (NT2):

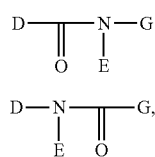

(NT1)

(NT2)

in which D is $C_6$-$C_{22}$-alkyl, preferably $C_{10}$-$C_{18}$-alkyl, E is hydrogen or $C_1$-$C_4$-alkyl, preferably methyl, and G is polyhydroxy-$C_5$-$C_{12}$-alkyl having at least 3 hydroxyl groups, preferably polyhydroxy-$C_5$-$C_6$-alkyl. For example, such compounds are obtained by acylating reducing aminated sugars with acid chlorides of $C_{10}$-$C_{18}$-carboxylic acids.

The detergent formulations preferably comprise $C_{10}$-$C_{18}$-alcohols ethoxylated with from 3 to 12 mol of ethylene oxide as nonionic surfactants.

Particularly suitable cationic surfactants are, for example, $C_7$-$C_{25}$-alkylamines; $C_7$-$C_{25}$-N,N-dimethyl-N-(hydroxyalkyl)ammonium salts; quaternized mono- and di($C_7$-$C_{25}$-)-alkyldimethylammonium compounds; ester quats such as quaternized esterified mono-, di- or trialkanolamines which have been esterified with $C_8$-$C_{22}$-carboxylic acids; and imidazoline quats such as 1-alkylimidazolinium salts of the general formulae KT1 or KT2:

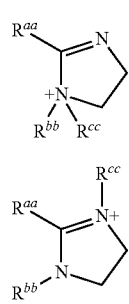

(KT1)

(KT2)

where $R^{aa}$ is $C_1$-$C_{25}$-alkyl or $C_2$-$C_{25}$-alkenyl, $R^{bb}$ is $C_1$-$C_4$-alkyl or -hydroxyalkyl and $R^{cc}$ is $C_1$-$C_4$-alkyl, -hydroxyalkyl or an $R^{aa}$—(CO)—$W^2$—$(CH_2)_n$— radical where $W^2$=O or NH and n=2 or 3, and at least one $R^{aa}$ is $C_7$-$C_{22}$-alkyl.

The pulverulent and granular detergents and also, if appropriate, structures (multiphasic) liquid detergents also comprise one or more inorganic builders. Suitable inorganic builders are also customarily used compounds such as aluminosilicates, silicates, carbonates and polyphosphates.

Specific examples include crystalline and amorphous aluminosilicates having ion-exchanging properties, such as zeolites, for example zeolite A, X, B, P, MAP and HS in their sodium form and in forms in which sodium has been partly exchanged for other cations such as Li, K, Ca, Mg or ammonium.

Suitable silicates are, for example, amorphous and crystalline silicates such as amorphous disilicates, sodium metasilicate, crystalline disilicates and sheet silicates, for example the sheet silicate SKS-6 (Clariant AG). The silicates may be used in the form of their alkali metal, alkaline earth metal or ammonium salts. Preference is given to using sodium silicates, lithium silicates and magnesium silicates.

Carbonates and hydrogencarbonates suitable as inorganic builders may likewise be used in the form of their alkali metal, alkaline earth metal and ammonium salts. Preference is given to carbonates and hydrogencarbonates of sodium, lithium and magnesium; particular preference is given to sodium carbonate and/or sodium hydrogencarbonate. An especially suitable phosphate is pentasodium triphosphate.

The inorganic builders may be present in the detergents in amounts of from 5 to 60% by weight. They may be incorporated into the detergent alone or in any combinations with one another. In pulverulent and granular detergents, they are added in amounts of from 10 to 60% by weight, preferably from 20 to 50% by weight. In structured liquid detergents, inorganic builders are used in amounts of up to 40% by weight, preferably up to 20% by weight. In this case, they are suspended in the liquid formulation constituents.

In addition to the inorganic builders, the detergent compositions comprise one or more organic cobuilders.

Suitable organic cobuilders are in particular:

Low molecular weight carboxylic acids such as citric acid, hydrophobically modified citric acid, for example agaric acid, malic acid, tartaric acid, gluconic acid, glutaric acid, succinic acid, imidodisuccinic acid, oxydisuccinic acid, propanetricarboxylic acid, butanetetracarboxylic acid, cyclopentanetetracarboxylic acid, alkyl- and alkenylsuccinic acids and aminopolycarboxylic acids, for example nitrilotriacetic acid, β-alaninediacetic acid, ethylenediaminetetraacetic acid, serinediacetic acid, isoserine-diacetic acid, N-(2-hydroxyethyl)iminodiacetic acid, ethylenediaminedisuccinic acid and methyl- and ethylglycinediacetic acid.

Oligomeric and polymeric carboxylic acids such as homopolymers of acrylic acid and aspartic acid, oligomaleic acids, copolymers of maleic acid with acrylic acid, methacrylic acid or $C_2$-$C_{22}$-olefins, for example isobutene or long-chain α-olefins, vinyl $C_1$-$C_8$-alkyl ethers, vinyl acetate, vinyl propionate, (meth)acrylic esters of $C_1$-$C_8$-alcohols and styrene. Preference is given to the homopolymers of acrylic acid and copolymers of acrylic acid with maleic acid. The oligomeric and polymeric carboxylic acids are used in acid form or as the sodium salt.

The organic cobuilders are present in the powdery and granular, and also in the structured liquid detergent compositions in amounts of from 0.1 to 15% by weight, preferably from 0.25 to 8% by weight. In liquid detergent compositions, they are present in amounts of from 0.1 to 20% by weight and preferably from 0.25 to 10% by weight.

The powdery and granular heavy duty detergent compositions may also comprise a bleach system consisting of at least one bleach, optionally in combination with a bleach activator and/or a bleach catalyst.

Suitable bleaches are, for example, adducts of hydrogen peroxide to inorganic salts, such as sodium perborate monohydrate, sodium perborate tetrahydrate and sodium carbonate perhydrate, and also inorganic and organic peracids in the form of their alkali metal or magnesium salts or in some cases also in the form of the free acids. Examples of suitable organic percarboxylic acids and salts thereof are magnesium monoperphthalate, phthalimidopercaprylic acid and dodecane-1,10-dioic peracid. An example of an inorganic peracid salt is potassium peroxomonosulfate (Oxon).

If bleaches are used, they are present in the formulations in amounts of from 5 to 30% by weight, preferably from 10 to 25% by weight.

Suitable bleach activators are, for example: acylamines such as N,N,N',N'-tetraacetylethylenediamine (TAED), tetraacetylglycoluril, N,N'-diacetyl-N,N'-dimethylurea and 1,5-diacetyl-2,4-dioxohexahydro-1,3,5-triazine; acylated lactams such as acetylcaprolactam, octanoylcaprolactam and benzoylcaprolactam; substituted phenol esters of carboxylic acids such as sodium acetoxybenzenesulfonate, sodium octanoyloxybenzenesulfonate and sodium p-nonanoyloxy-benzenesulfonate; N-methylmorpholinium acetonitrilemethylsulfate and hydrogensulfate; acylated sugars such as pentaacetylglucose; anthranil derivatives such as 2-methylanthranil and 2-phenylanthranil; enol esters such as isopropenyl acetate; oxime esters such as o-acetylacetone oxime; carboxylic anhydrides such as phthalic anhydride and acetic anhydride.

Preference is given to using tetraacetylethylenediamine, sodium nonanoyloxybenzenesulfonate and N-methylmorpholinium acetonitrilemethylsulfate and hydrogensulfate as bleach activators.

If the bleach activators are used in detergents, they are present in amounts of from 0.1 to 15% by weight, preferably in amounts of from 1 to 8% by weight, more preferably in amounts of from 1.5 to 6% by weight.

Suitable bleach catalysts are quaternized imines and sulfonimines and manganese and cobalt complexes. If bleach catalysts are used in the detergent formulations, they are present in amounts of up to 1.5% by weight, preferably up to 0.5% by weight; in the case of the very active manganese complexes in amounts of up to 0.1% by weight.

The detergent composition preferably comprises an enzyme system. This typically comprises proteases, lipases, amylases or cellulases. The enzyme system may be restricted to a single enzyme or include a combination of different enzymes. Of the commercial enzymes, amounts of from 0.1 to 1.5% by weight, preferably from 0.2 to 1% by weight, of the formulated enzymes are generally added to the detergents. Suitable proteases are, for example, Savinase and Esperase (manufacturer Novo Nordisk); a suitable lipase is, for example, Lipolase (manufacturer Novo Nordisk); a suitable cellulase is, for example, Celluzym (manufacturer likewise Novo Nordisk).

The detergent composition preferably also comprises soil-release polymers and/or graying inhibitors. These are, for example, polyesters composed of polyethylene oxides capped at one end by di- and/or polyhydric alcohols, in particular ethylene glycol and/or propylene glycol (alcohol component), and aromatic dicarboxylic acids or aromatic and aliphatic dicarboxylic acids (acid component).

Further suitable soil-release polymers are amphiphilic graft polymers and copolymers of vinylic and/or acrylic esters, on or with polyalkylene oxides and modified celluloses, for example methylcellulose, hydroxypropylcellulose and carboxymethylcellulose.

Soil-release polymers used with preference are graft polymers of vinyl acetate on polyethylene oxide of average molecular weight $M_w$, from 2500 to 8000 in a weight ratio of from 1.2:1 to 3:1, and also commercial polyethylene terephthalate/polyoxyethylene terephthalates of average molecular weight $M_w$ from 3000 to 25 000, composed of polyethylene oxides of average molecular weight $M_w$ from 750 to 5000 with terephthalic acid and ethylene oxide and a molar ratio of polyethylene terephthalate to polyoxyethylene terephthalate of from 8:1 to 1:1 and block polycondensates which contain blocks of (a) ester units of polyalkylene glycols of average molecular weight $M_w$ from 500 to 7500 and aliphatic dicarboxylic acids and/or monohydroxy monocarboxylic acids, and (b) ester units of aromatic dicarboxylic acids and polyhydric alcohols. These amphiphilic block polymers have average molecular weights $M_w$ of from 1500 to 25 000.

Graying inhibitors and soil-release polymers are present in the detergent formulations in amounts of from 0 to 2.5% by weight, preferably from 0.2 to 1.5% by weight, more preferably from 0.3 to 1.2% by weight.

The invention further provides a solid detergent composition comprising
a) from 0.05 to 5% by weight, preferably from 0.1 to 2% by weight, of the polymer composition according to the invention;
b) from 0.5 to 40% by weight of at least one nonionic, anionic and/or cationic surfactant;
c) from 0.5 to 50% by weight of at least one inorganic builder;
d) from 0 to 10% by weight of at least one organic cobuilder;
e) from 0 to 60% by weight of other customary ingredients such as extenders, enzymes, perfume, complexing agents, corrosion inhibitors, bleaches, bleach activators, bleach catalysts, further dye transfer inhibitors, graying inhibitors, soil-release polyesters, fiber and color protection additives, silicones, dyes, bactericides, dissolution improvers and/or disintegrants;
the sum of the components a) to e) being 100% by weight.

The invention further provides a liquid detergent formulation comprising
a) from 0.05 to 5% by weight, preferably from 0.1 to 2% by weight, of the polymer composition according to the invention;
b) from 0.5 to 40% by weight of at least one nonionic, anionic and/or cationic surfactant;
c) from 0 to 20% by weight of at least one inorganic builder;
d) from 0 to 10% by weight of at least one organic cobuilder;
e) from 0 to 60% by weight of other customary ingredients such as sodium carbonate, enzymes, perfume, complexing agents, corrosion inhibitors, bleaches, bleach activators, bleach catalysts, further dye transfer inhibitors, graying inhibitors, soil-release polyesters, fiber and color protection additives, silicones, dyes, bactericides, solubilizers, hydrotropes, thickeners and/or alkanolamines; and
f) from 0 to 99.45% by weight of water, and/or polyhydric, water-miscible alcohols, such as monopropylene glycol, dipropylene glycol and glycerol, and also mixtures thereof.

A detailed description of the detergent ingredients can be found, for example, in WO 99/06524 or WO 99/04313, and in Liquid Detergents, Editor: Kuo-Yann Lai, Surfactant Sci. Ser.; Vol. 67, Marcel Dekker, New York, 1997, p. 272-304.

In addition, the polymer composition according to the invention are suitable for the following applications: as brighteners in cleaning compositions, assistants in textile production, assistants in cosmetic formulations, adjuvants in agrochemical formulations, additives in water treatment, assistants in metal processing agents and cooling lubricants, and also as gas hydrate inhibitors and in other fields of application in the oilfield sector.

The examples which follow serve to illustrate the invention.

I) POLYMERIZATION EXAMPLES

Example 1

The weight ratio of acrylic acid to maleic anhydride is 70:30. A 2 L reactor is charged with 214.00 g of deionized water and 117.60 g maleic anhydride are placed under nitrogen, and heated to a inside temperature of 60° C. while stirring. When an internal temperature of 60° C. is reached, 172.80 g of a 50% solution of caustic soda is added over the course of two hours, allowing the internal temperature of the vessel to rise to 100° C. After completion of the addition of caustic soda, 325.00 g of acrylic acid, and 261.60 g of an aqueous solution of sodium hypophosphite (59%) are charged linearly at such a rate that the addition is complete in four hours. Simultaneously, 398.34 g of aqueous hydrogen peroxide (4.4%) initiator are charged linearly into the vessel such that the addition is complete in five hours. Postpolymerization is commenced at 100° C. for one hour. The vessel is then cooled to 80° C., and 300.00 g of a 50% sodium hydroxide is then charged into the vessel under continuous stirring for one hour. The inside temperature is not allowed to exceed 100° C. during this step. The resulting solution is then cooled, drained and evaluated for appearance, pH, K value, Mn, Mw, % solids and % residual monomers.

| Characteristics of the dispersion | Unit | Measurement or assessment |
|---|---|---|
| Appearance | | clear, slight yellow solution; solubility: water soluble |
| Solids content[a] | (wt. %) | 40.5 |
| pH | | 6.5 |
| K value[b] | | 40.5 |
| $M_w$[c] | (g/mol) | 20400 |
| $M_n$[c] | (g/mol) | 4660 |

[a]ISO 3251, (0.25 g, 150° C., 2 h)
[a]determined by the Fikentscher method on a 1% strength solution in NMP
[b]determined by gel permeation chromatography Example 2

The procedure of example 1 was repeated with the following differences:
The weight ratio of acrylic acid to maleic anhydride is 90:10. The amount of water and maleic anhydride which are precharged are 214.4 g and 39.2 g, respectively. The amount of sodium hydroxide is 57.6 g (50%). The amount of acrylic acid is 417.8 g. The amount of initiator and chain transfer agent is changed to 338.20 g and 386.40 g of aqueous solutions of sodium hypophosphite (59%) and hydrogen peroxide (4.4%), respectively. Finally the solution polymer was neutralised with additional 463.00 g of sodium hydroxide (50%). The resulting solution is also evaluated for appearance, pH, K value, Mn, Mw, % solids.

| Characteristics of the dispersion | Unit | Measurement or assessment |
|---|---|---|
| Appearance | | clear, slight yellow solution; solubility: water soluble |
| Solids content[a] | (wt. %) | 40.6 |
| pH | | 7.0 |
| K value[b] | | 19.2 |
| $M_w$[c] | (g/mol) | 3510 |
| $M_n$[c] | (g/mol) | 1770 |

[a]ISO 3251, (0.25 g, 150° C., 2 h)
[b]determined by the Fikentscher method on a 1% strength solution in deionized water
[c]determined by gel permeation chromatography Example 3

The procedure of example 1 was repeated with the following differences:
The weight ratio of acrylic acid to maleic anhydride is 70:30. The amount of water and maleic anhydride which are precharged are 214.4 g and 117.60 g, respectively. The amount of sodium hydroxide is 141.70 g (50%). The amount of acrylic acid is 325.00 g. The amount of chain transfer agent and initiator is changed to 102.28 g and 386.40 g of aqueous solutions of sodium hypophosphite (59%) and hydrogen peroxide (3.6%), respectively. Finally the solution polymer was neutralised with additional 463.00 g of sodium hydroxide (50%). The resulting solution is also evaluated for appearance, pH, K value, Mn, Mw, % solids.

| Characteristics of the dispersion | Unit | Measurement or assessment |
|---|---|---|
| Appearance | | clear, slight yellow solution; solubility: water soluble |
| Solids content[a] | (wt. %) | 41.3 |
| pH | | 6.2 |
| K value[b] | | 15.9 |
| $M_w$[c] | (g/mol) | 2170 |
| $M_n$[c] | (g/mol) | 873 |
| acrylic acid | (ppm) | 0 |
| maleic acid | (wt.-%) | <0.05 |
| hydrogen peroxide | (ppm) | 50 |

[a]ISO 3251, (0.25 g, 150° C., 2 h)
[b]determined by the Fikentscher method on a 1% strength solution in deionized water
[c]determined by gel permeation chromatography Example 4

The weight ratio of acrylic acid to maleic anhydride is 40:60.
A 2 L reactor is charged with 91.60 g of deionized water, 0.1 g of an aqueous solution of iron (II) sulphate heptahydrate (5%) and 246.40 g maleic anhydride are placed under nitrogen, and heated to a inside temperature of 60° C. while stirring. When an internal temperature of 60° C. is reached, 341.90 g of a 50% solution of caustic soda is added over the course of two hours, allowing the internal temperature of the vessel to rise to 100° C. After completion of the addition of caustic soda, 398.15 g of an aqueous solution of acrylic acid, and 80.00 g of an aqueous solution of sodium hypophosphite (30.4%) are charged linearly at such a rate that the addition is complete in six hours. Simultaneously, 116.50 g of aqueous hydrogen peroxide (25.0%) initiator is charged linearly into the vessel such that the addition is complete in seven hours. Postpolymerization is commenced at 100° C. for two hour. The vessel is then cooled to 80° C. adding 170.00 g deionized water. Then 135.00 g of a 50% sodium hydroxide is then charged into the vessel under continuous stirring for one hour. The inside temperature is not allowed to exceed 100° C. during this step. The resulting solution is then cooled, drained and evaluated for appearance, pH, K value, Mn, Mw, % solids and % residual monomers.

| Characteristics of the dispersion | Unit | Measurement or assessment |
|---|---|---|
| Appearance | | clear, colourless solution; solubility: water soluble |
| Solids content[a] | (wt. %) | 42.7 |
| pH | | 6.2 |
| K value[b] | | 18.2 |
| $M_w$[c] | (g/mol) | 3880 |
| $M_n$[c] | (g/mol) | 1710 |

[a]ISO 3251, (0.25 g, 150° C., 2 h)
[b]determined by the Fikentscher method on a 1% strength solution in deionized water
[c]determined by gel permeation chromatography

II) APPLICATION EXAMPLES

A) Determination of Inhibition of Incrustation

A measure of the amount of water-hardening salts which are deposited on the textile fabric during washing is the weight of the ash which remains after incineration of the washed fabric. The polymers added to the detergent formulations serve to minimize such incrustation. The percentages of ash listed in table 1 below are based on the weight of the dry test fabric prior to washing and were determined by the usual method of incineration in a muffle furnace at 700° C.

The incrustation was examined under the following test conditions:

Apparatus: Launder-O-meter (Atlas, Chicago, U.S.A.)
Number of washes: 15
Washing liquid: 500 ml
Water hardness: 4 mmol/L (Ca:Mg:HCO$_3$=4:1:8)
Duration of wash: 30 minutes at 40° C.
Detergent concentration: 5 g/l
Test fabric: 10 g of EMPA 211 and 10 g of wfk 12A The detergent formulation used was as follows:
12.0% sodium-C$_{12}$-alkylbenzene sulfonate (50% aqueous soln.)
3.0% adduct of 7 moles of ethylene oxide with 1 mole of C$_1$/C$_{15}$-oxoalcohol
20% conventional zeolite A
2.5 or 5% (co)polymer (according to the invention or comparative; see table 1)
10% sodium metasilicate×5H$_2$O
15% sodium carbonate
1% carboxy methyl cellulose
ad 100% anhydrous sodium sulfate

TABLE 1

| | (5% copolymer) | | |
|---|---|---|---|
| example no. | polymer | EMPA 211 ash [%] | wfk 12A ash [%] |
| C1 (comparative) | without | 5.82 | 8.63 |
| C2 (comparative) | polyacrylic acid Na-salt, M$_w$ 1200*) | 3.08 | 4.22 |
| A1 | from example 1 | 1.61 | 2.73 |
| A2 | from example 2 | 1.89 | 3.58 |
| A3 | from example 3 | 1.62 | 2.75 |
| A4 | from example 4 | 1.70 | 3.18 |

*)produced in the absence of hypophosphorous acid and/or a salt thereof,

The polymers of the invention are clearly superior to the conventional polymer in their ability to provide good inhibition of incrustations.

B) Investigation of the Grayness-Inhibiting Action

The grayness-inhibiting action of the polymers was tested as follows: resective test (wfk 20A, wfk 30A, EMPA 406 and cotton) fabric was subjected, together with standard soiled fabric (EMPA 101/SBL and BASF standard clay SBL), to a series of 3 washes. The soiled fabric was replaced after each wash, the test fabric becoming more soiled after each wash. The degree of graying was the degree of whiteness of the white test fabric before and after washing. The degree of whiteness of the test fabric after the third wash was used to determine the degree of soiling. The degree of whiteness was determined by photometric measurement of the reflectance using an Elrepho 2000 photometer (Datacolor) at a wavelength of 460 mm (barium primary white standard in accordance with DIN 5033). The values were verified by repeating the experiment a number of times and determining the average value. The test detergent used in the experiments was the same as in A) only containing 2.5% of respective polymer according to the invention.

| example no. | polymer | wfk 20A R [%] | wfk 30A R [%] | EMPA 406 R [%] | sum (wfk 20A, 30A, EMPA 406) R [%] |
|---|---|---|---|---|---|
| C1 (comparative) | without | 76.9 | 76.4 | 73.6 | 226.9 |
| B1 | from example 1 | 78.7 | 79.3 | 75.0 | 233.0 |
| B2 | from example 2 | 78.2 | 78.8 | 75.8 | 232.8 |
| B3 | from example 3 | 79.0 | 76.9 | 75.9 | 231.7 |

| example no. | polymer | sum cotton[+) R [%] | total sum R [%] |
|---|---|---|---|
| C1 (comparative) | without | 386.0 | 612.9 |
| B1 | from example 1 | 389.2 | 622.2 |
| B2 | from example 2 | 388.3 | 621.1 |
| B3 | from example 3 | 391.0 | 622.7 |

[+)wfk 10A, 12A, 20A, 30A, 80A, EMPA 221, T shirt

The invention claimed is:

1. A process for preparing a polymer by free-radical polymerization of
   a) at least one ethylenically unsaturated monocarboxylic acid and/or a salt thereof,
   b) at least one ethylenically unsaturated dicarboxylic acid and/or an anhydride and/or a salt thereof,
   in the presence of c) hypophosphorous acid and/or a salt thereof,
   comprising
   providing in a polymerization zone an initial charge that comprises at least a part of monomer component b) and adding a monomer feed, comprising at least a part of monomer component a) to the polymerization zone, wherein during the addition of the monomer feed at least a part of the hypophosphorous acid or a salt thereof is added to the polymerization zone.

2. A process as claimed in claim 1, wherein the amount of component c) in the initial charge does not exceed 50% by weight, based on total amount of component c) employed.

3. A process as claimed in claim 1 or 2, wherein essentially no component c) is employed in the initial charge.

4. A process as claimed in claim 1, wherein the amount of component c) is in a range of from 0.1 to 30 parts by weight, based on the total monomer weight.

5. A process as claimed in claim 1, wherein the amount of component b) in the initial charge is at least 50% by weight, based on the total amount of component b) employed.

6. A process as claimed in claim 1, wherein essentially the total amount of component b) is employed in the initial charge.

7. A process as claimed in claim 1, wherein monomer a) comprises acrylic acid or a salt thereof.

8. A process as claimed in claim 1, wherein monomer a) consists of acrylic acid and/or a salt thereof.

9. A process as claimed in claim 1, wherein monomer b) comprises maleic acid and/or maleic anhydride and/or a salt thereof.

10. A process as claimed in claim 1, wherein monomer b) is exclusively selected from maleic acid, maleic anhydride and maleic acid salts.

11. A process as claimed in claim 1, wherein a polymerization initiator is employed that comprises hydrogen peroxide or consists of hydrogen peroxide.

12. A process as claimed in claim 1, wherein essentially no polymerization initiator is employed in the initial charge.

* * * * *